Aug. 12, 1924.
R. S. TROGNER
TIRE BUILDING MACHINE
Filed Oct. 23, 1919
1,504,729
5 Sheets-Sheet 2
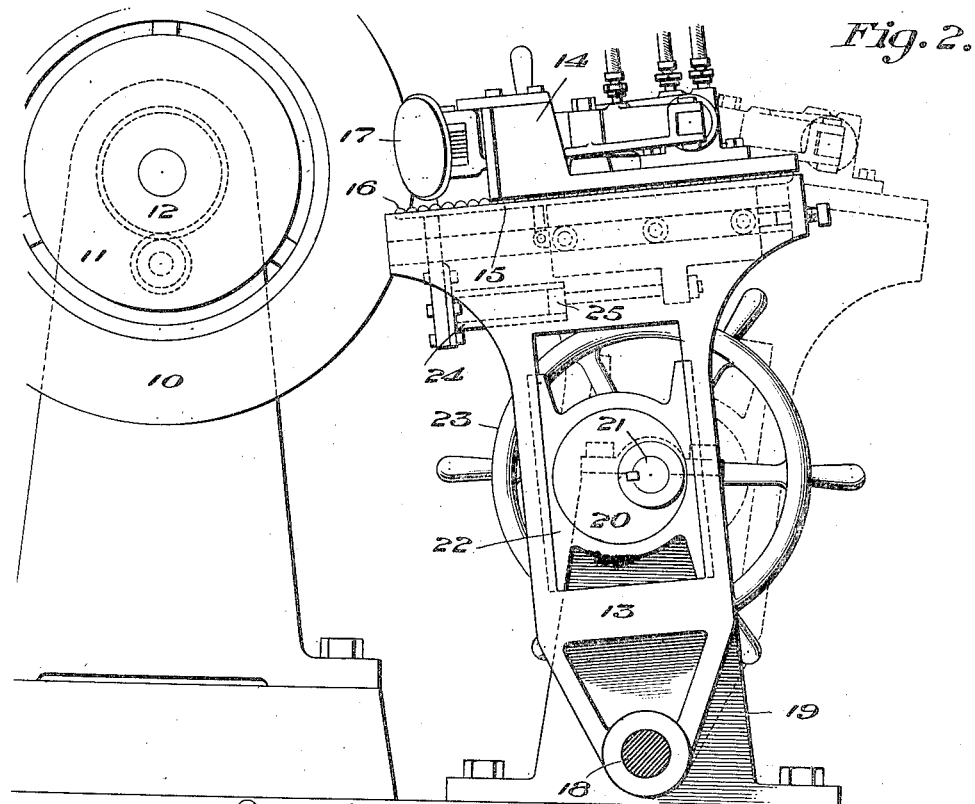
Fig. 2.
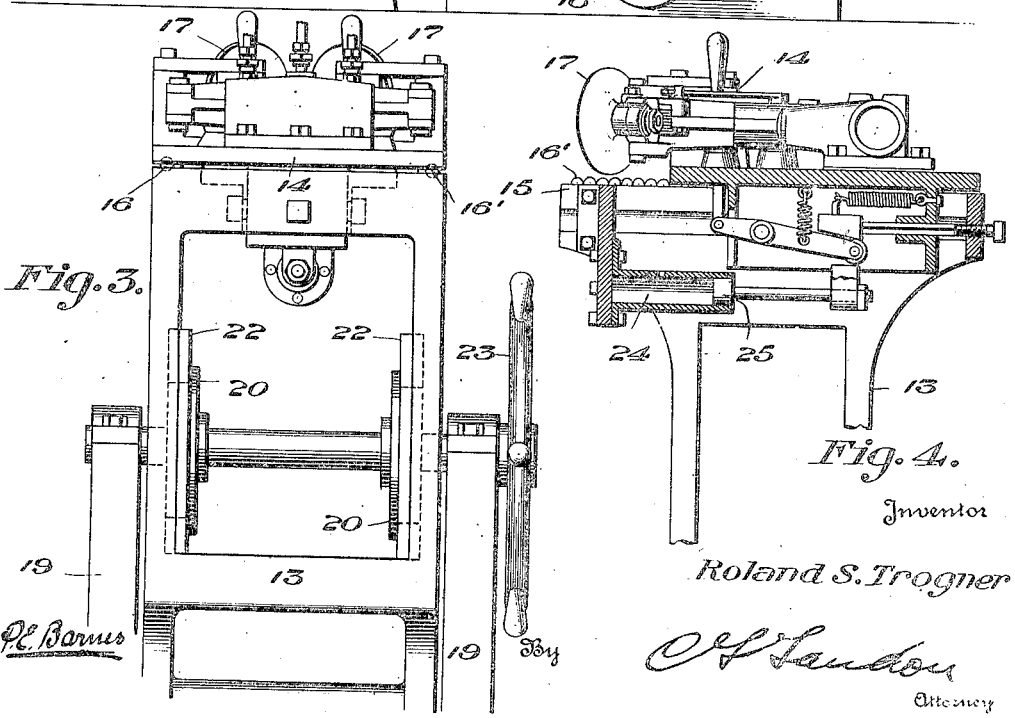
Fig. 3.
Fig. 4.
Inventor
Roland S. Trogner Aug. 12, 1924.
R. S. TROGNER
1,504,729
TIRE BUILDING MACHINE
Filed Oct. 23, 1919    5 Sheets-Sheet 4
Fig. 7.
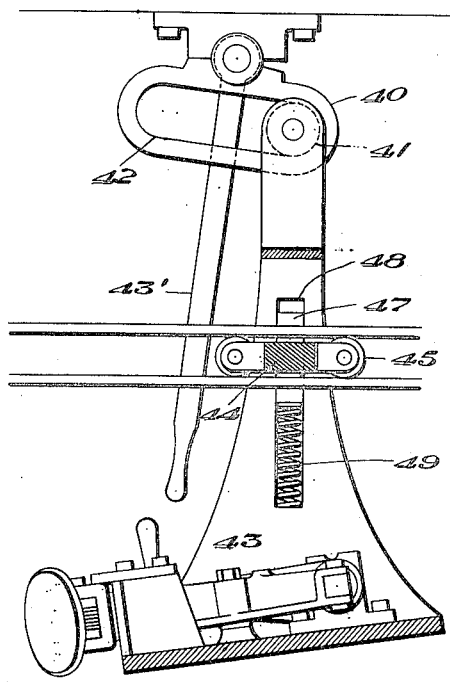
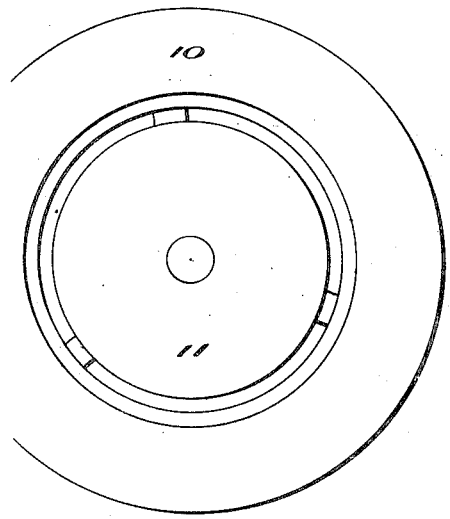
Inventor
Roland S. Trogner
P.E. Barnes
By    C. H. Landon
Attorney

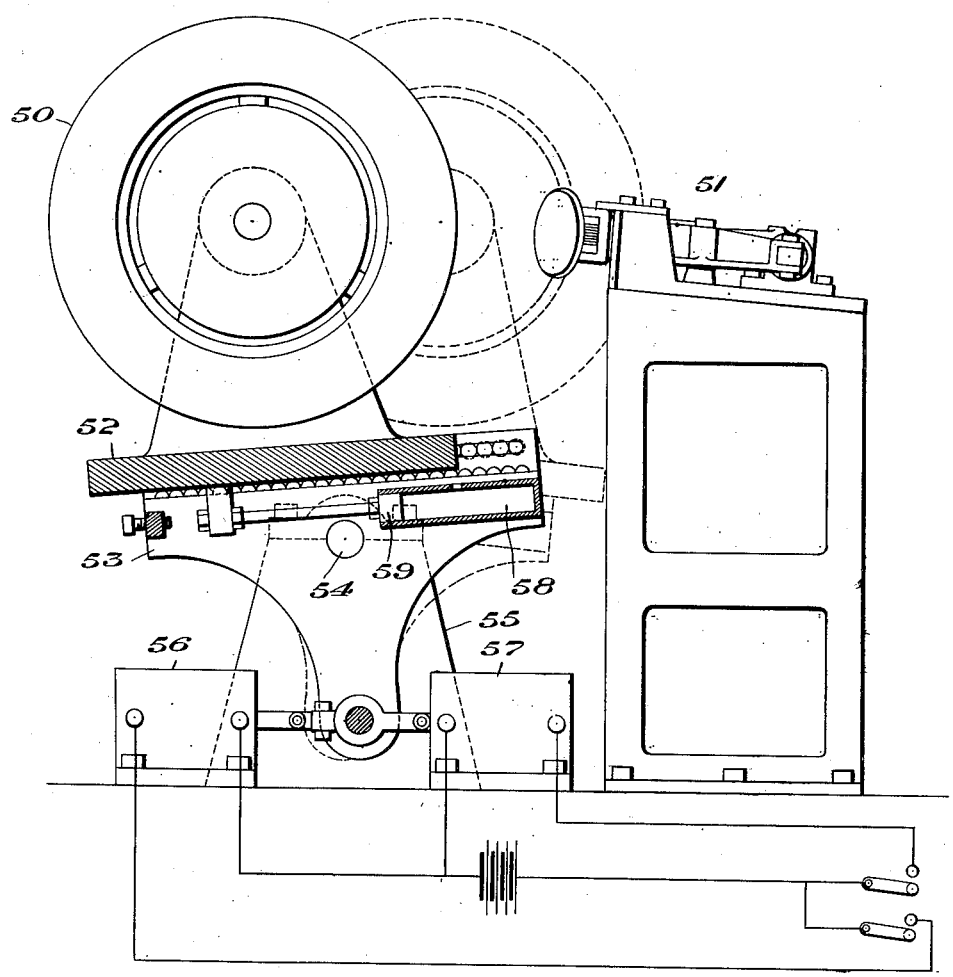

Patented Aug. 12, 1924.

1,504,729

UNITED STATES PATENT OFFICE.

ROLAND S. TROGNER, OF AKRON, OHIO, ASSIGNOR TO THE GOODYEAR TIRE & RUBBER COMPANY, OF AKRON, OHIO, A CORPORATION OF OHIO.

TIRE-BUILDING MACHINE.

Application filed October 23, 1919. Serial No. 332,667.

*To all whom it may concern:*

Be it known that I, ROLAND S. TROGNER, a citizen of the United States, and resident of Akron, Ohio, have invented new and useful Improvements in Tire-Building Machines, of which the following is a specification.

This invention relates to machines for building tires, and has more especial reference to structures for stitching tire fabric about a forming-core or mandrel in the construction of a so-called tire carcass.

Heretofore, it has been the general practice, in machines of this character, to effect movement of a stitcher-sustaining carriage in relation to an associated core by mechanism, operated either manually or by power. Obviously, if the machine be one which requires manual manipulation to effect a positioning of the stitcher device toward and along the surface of the fabric-covered core, the operator is seriously handicapped in not having both hands free for other work in connection with the machine. On the other hand, it is equally obvious that, if the machine be of the type which requires power mechanism to effect movement of the carriage, such machine is characterized by more or less complexity and involves considerable structure, with consequent weight, and occupies considerable space.

It is the primary desideratum of the present invention greatly to simplify this type of machine and to provide a structure of the simplest possible character; and yet to include therein such an arrangement that the stitcher-supporting carriage shall be caused to move either toward or away from the tire-forming core, and in both directions if desired, under the influence of gravity. In other words, by the provision of a gravity-controlled carriage, motion thereof toward the core, and away from it if desired, is effected by a force which is neither manual nor power, but which is nevertheless effective to cause the stitcher device to perform its function of laying the fabric down upon the core effectually and quickly. By such an arrangement, an exceedingly compact structure is provided, and much valuable floor space is thus saved.

Another object within the contemplation of my invention is the provision in a structure, comprising a tire-forming core and an associated stitcher-sustaining carriage, of a support for the carriage which is positionable for effecting movement of the carriage under the influence of gravity. Obviously, this force may be augmented by other forces or means, and it is within the spirit of my invention to employ such other means, if desired; but the primary force utilized to effect motion of the carriage is that of gravity.

With these and other objects in view, the invention resides in the instrumentalities, in a related aggroupment thereof, and in the manner of operating the same, all as more fully disclosed.

In the accompanying drawings, I have elected to reveal the invention in several possible embodiments thereof, the purpose of thus disclosing the same in several forms being to make clear that the invention is susceptible of a wide range of modification and variation without departing from its spirit or sacrificing any of its salient features and underlying principles.

In these drawings:

Figure 2 is a side elevation showing a tire-forming core, an associated stitcher-supporting carriage, and a carriage support positioned to effect a gravitating movement of the carriage toward the core;

Figure 3 is a rear elevation of a part of the stitcher-supporting carriage, the carriage support and parts associated therewith;

Figure 4 is a fragmentary longitudinal sectional view with parts shown in elevation;

Figure 7 is a side elevation partly in section of a further modified form of structure; and Figure 8 is a side elevation of a modified form of the device showing a tire forming core movable toward and away from a stitcher support, through the action of gravity.

Figure 1:
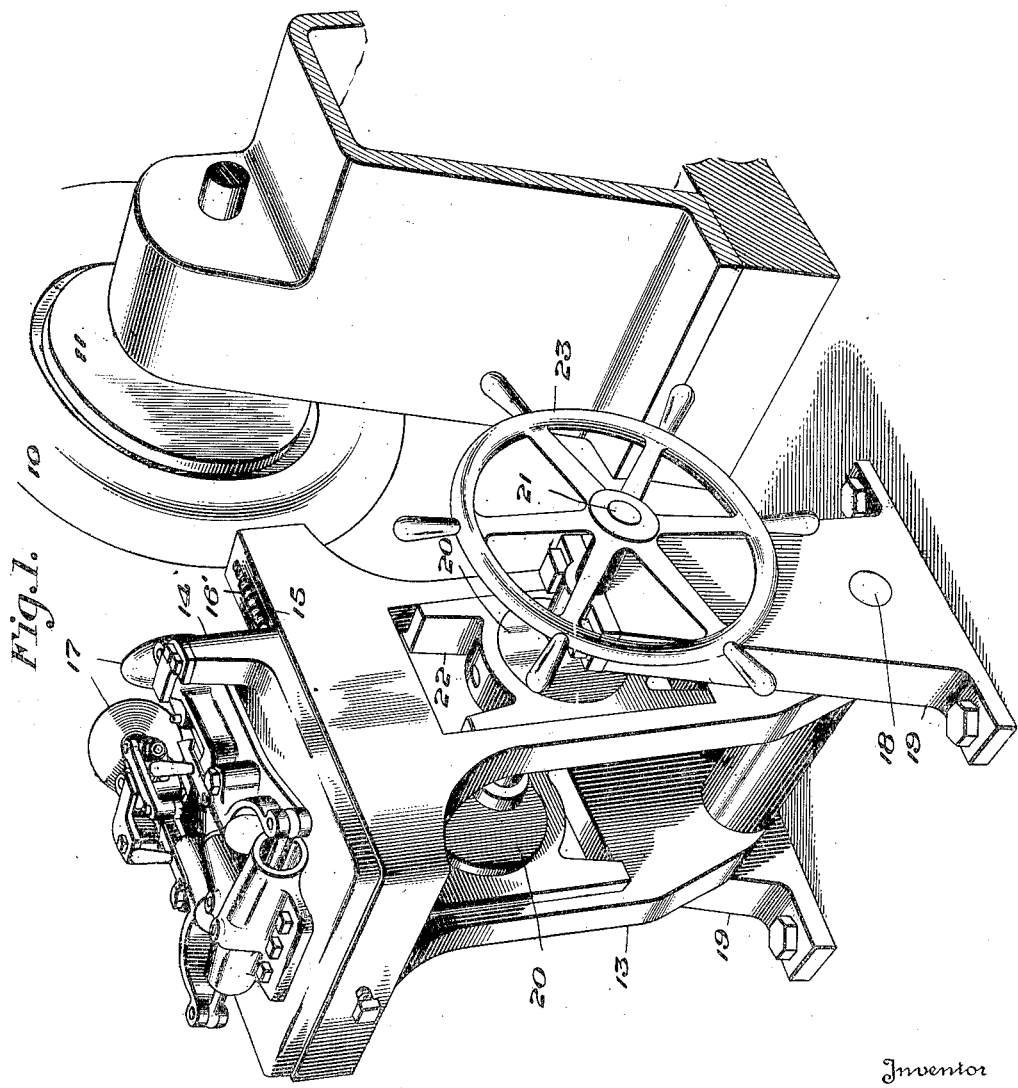
Figure 1 is a view in perspective of a tire building machine constructed in accordance with my invention and disclosed as one type or embodiment thereof.

Referring to the drawings, and to the type of mechanism illustrated in Figures 1 to 4, reference numeral 10 designates generally a tire forming core of any appropriate type, and preferably disposed for rotation on a core chuck 11, which is driven by mechanism designated, generally, by the numeral 12.

Associated with the tire-forming core is a support 13 which may be of any required type or form; and either it, in its entirety, or a portion of it, is preferably actuable to change its position for a purpose presently explained.

Mounted to travel upon the support for a to-and-fro movement in relation to the core 10 is a carriage 14 or similar stitcher-supporting instrumentality movable longitudinally of the stitcher supporting surface 15 of the support 13 and upon anti-friction rolls 16 and 16'. This carriage may be of any required construction or form, the construction herein illustrated being an adaptation of the stitcher carriage and actuating mechanism illustrated in the pending application of Nall and Harsel, filed Nov. 3, 1917, Serial No. 200,185. The stitcher actuating mechanism "per se" forms no part of the present invention and therefore a detailed description of the same has been omitted, it being sufficient to say that a pair of revolving stitchers 17 are supported upon the carriage 14 for various movements about the fabric covered surface of the tire-forming core 10 during the stitching operation. Obviously many different ways of effecting a gravitating movement of the carriage on the support may be provided, but a simple and effective plan is to change the position of the support thereby to incline the carriage-supporting surface 15 thereof from the horizontal. As shown in Figs. 1 to 3 for example, the support 13 is pivoted at 18, adjacent its lower end between a pair of upright supports 19, and adapted to oscillate upon its pivot to change its carriage supporting surface 15 to the positions indicated in dotted and full lines in Fig. 2 of the drawings. By swinging the carriage 13 upon its pivot to change the angle of inclination of the carriage-supporting surface 15 a gravitating movement of said carriage upon its support and toward and away from the core is effected without the employment of complex and expensive mechanisms. Any desired means for rocking the support 13 upon its pivot 18 may be provided such as have been illustrated in Figs. 1 to 4, said means comprising eccentrics 20 keyed upon a cross-shaft 21 journaled in the upright supports 19, and operating in eccentric blocks 22 to move the same in guide ways in the support 13. The shaft 21 may be rocked from left to right by means of a handwheel 23 as illustrated, or a mechanical drive may be employed if desired. Means for retarding or braking the movement of the carriage 14 upon the support 13 may be provided in order to prevent the stitches 17 from abruptly contacting with the fabric upon the tire-forming core 10 and tearing or otherwise mutilating the same, said means comprising a dashpot 24 mounted upon the support 13 and a plunger 25 carried upon the carriage 14.

Figure 5:
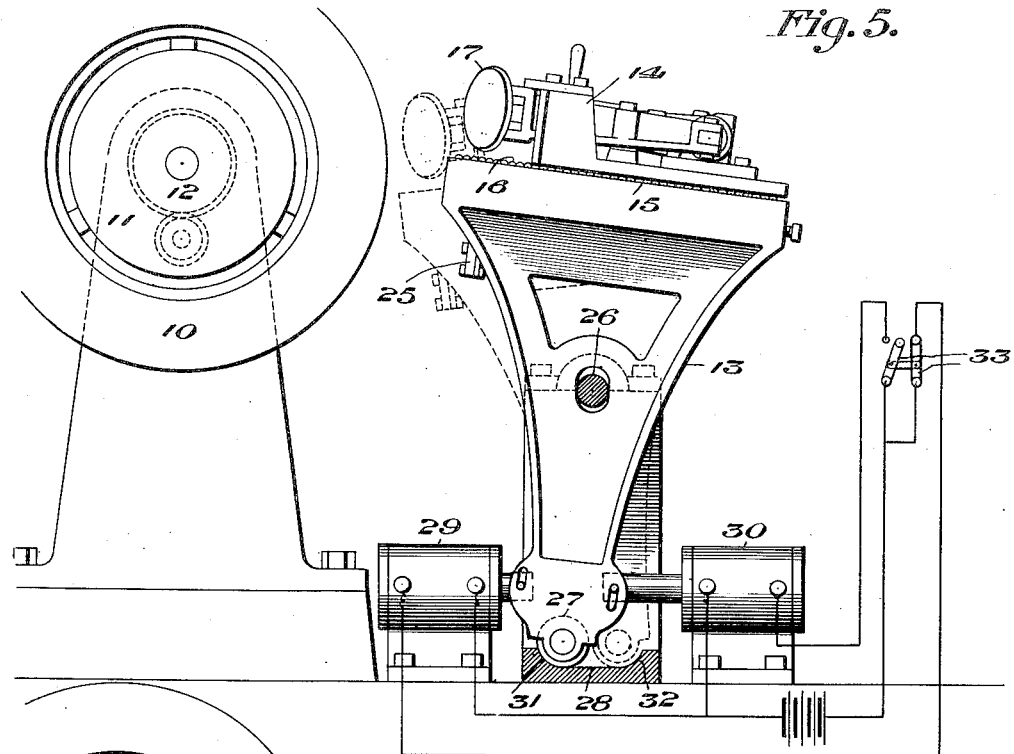
Figure 5 is a view similar to Figure 2, of a modified structure showing the normal position of the device in full lines, and in dotted lines the active position of the support when the carriage and stitchers are moved forward under the influence of gravity.
Figure 6:
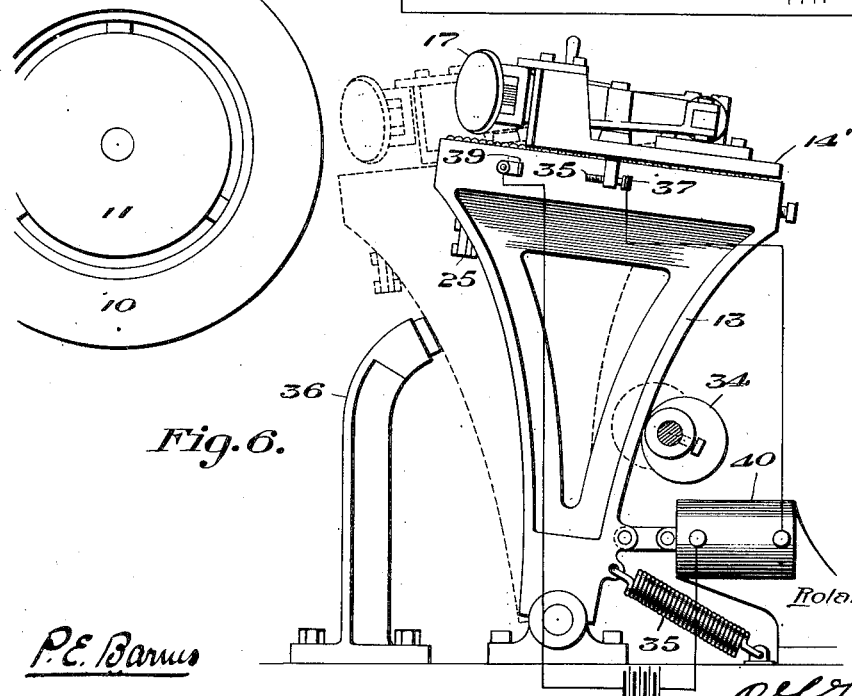
Figure 6 is a side elevation of a second modification with the parts shown in normal position in full lines and in active position in dotted lines.

In Figs. 5 and 6 I have shown other forms of structure for moving the carriage support to produce the gravitating movement of the carriage toward and away from the core whereby the stitchers mounted upon said carriage are moved to traverse the sides of said core.

In Fig. 5 for example, the support 13 is mounted to oscillate upon a shaft 26, and is provided at its lower end with a roller 27 travelling in track 28. Arranged upon opposite sides of the support 13 are solenoid devices 29 and 30 which are adapted to move the support to shift it at an angle, said shifting movement being limited by stop shoulders 31 and 32 formed at each end of the track 28. The solenoid devices 29 and 30 are controlled by a switch 33.

In Fig. 6 the support 13 is pivoted at its base and is adapted to be swung on said pivot toward the core by means of an eccentric 34 which throws the support past its vertical center against the pull of a retractile spring 35. Suitable means for limiting the forward swing of the support are provided as at 36. The stitcher supporting carriage 14' is provided at 37 with an adjustable contact 38, which, when said carriage has travelled the distance upon the support 13 required for the stitching operation, engages with a second contact 39 upon the support 13 to close an electric circuit and energize a solenoid device 40 which returns said support to its starting position.

In Fig. 7 I have shown a somewhat different type of construction. In this instance the support 13 and stitcher devices 43 are suspended from a pivoted bracket 40 by means of a roller 41 travelling in an elongated slot 42 in said bracket. The bracket 40 may be manipulated in any desired manner, such as by a hand lever 43', to position the elongated slot 42 at any angle to the horizontal, whereupon the support 13 will move toward and away from the core and thereby cause the stitcher devices 43 to perform their required function on the fabric being formed about the core. In order to retain the support 13 in a vertical position means are provided comprising a member 44 movable with the support 13 and provided with rollers 45 travelling in a track 46. Vertical guides upon the member 44, one of which is shown at 47, engage in slots 48 in the brackets 13 and coil springs, one of which is shown at 49, are interposed between the guides 47 and the bottom of the slots 48. As the bracket 40 is manipulated to incline the slot 42, support 13 is raised upon the vertical guides 47 against the action of coil springs 49. Thus the coil spring 49 serves to exert a pull upon the roller 41 and acts to initially start the device in its travel toward and away from the core as desired.

In Fig. 8 the structure has been somewhat reversed and a core 50 is mounted to gravitate toward and away from a stationary stitcher device 51. In this structure a core supporting carriage 52 is mounted for movement upon a support 53 pivoted at 54 to rock between supports 55. Solenoid devices 56 and 57 are provided whereby the support 53 is rocked upon its pivot 54 and a dash-pot 58 and plunger 59 are provided upon the support 53 and carriage 52 respectively for braking the descent of the carriage and core against the stitchers.

It will now be understood that my invention contemplates the disposition of a tire-forming core and a stitcher device in such manner that one may travel toward the other under the influence of gravity. Thus a change of relation between the core and the stitcher is accomplished by the force of gravity.

By reason of the fact that gravity is utilized as the primary moving force of my machine, intricate and room-occupying mechanism for producing motion upon a stitcher carriage are avoided and an exceedingly simple construction for the purpose is provided, with consequent advantages in operation and results.

What I claim is:

1. A tire-building machine including a tire-forming core, a support associated therewith, and a stitcher-sustaining carriage having an advancing and receding movement on the support, and dependent entirely upon the action of gravity for its advancing movement.

2. A tire-building machine including a tire-forming core, a support associated therewith, and a stitcher-sustaining carriage having an advancing and receding movement on the support, and dependent entirely upon the action of gravity for its advancing movement, and also for its receding movement.

3. A tire-building machine including a support, a tire-forming core associated therewith, a stitcher-supporting instrumentality influenced by the force of gravity to advance toward the core, and means for maintaining the carriage inactive and against the influence of the gravity-force.

4. A tire building machine comprising a rotatable core element, a mounting therefor, a second mounting adjacent said first mounting adapted to be swung through the influence of gravity toward or away from said first mounting, a stitcher mechanism carried upon the swingable mounting, and means including an eccentric operable to effect initial movement of the swingable mounting in either direction.

5. A tire building machine comprising, a rotatable core, a mounting adapted to be swung by the force of gravity toward or away from the core about an axis parallel with the axis of rotation of said core, a stitcher mechanism carried upon the mounting, and means including an eccentric operable to effect the initial movement of said mounting in either direction.

6. A tire-building machine including a tire-forming core, an oscillating support associated therewith, and a stitcher-sustaining carriage moving on the support said support and carriage being adapted to be moved out of equilibrium whereby the carriage is caused to move toward or away from the core.

7. A tire-building machine including a tire-forming core, a support associated therewith, a stitcher-sustaining carriage movable on the support, and means for shifting the support from its normal plane to one at an angle thereto whereby the carriage and the support are moved out of equilibrium and said carriage is caused to travel in relation to the core entirely by the force of gravity.

8. A tire-building machine including a tire-forming core, a stitcher-supporting device associated therewith, a support for the device and on which the same travels in relation to the core, and having a carriage supporting surface positionable at an angle to the horizontal whereby the carriage is moved out of equilibrium and is caused to advance toward the core by a force which includes gravity.

9. A tire-building machine including a tire-forming core, a stitcher-supporting carriage associated therewith and movable in relation thereto, and a support for the carriage shiftable to position its carriage-supporting surface at an angle to the horizontal whereby the carriage is moved out of equilibrium and is caused to advance toward the core entirely by the force of gravity.

10. A tire-building machine including a tire-forming core, a stitcher-supporting carriage associated therewith and movable in relation thereto, a support for the carriage shiftable to position its carriage-supporting surface at an angle to the horizontal whereby the carriage is moved out of equilibrium and is caused to move toward the core entirely by the force of gravity, and means active on the support for imparting movement thereto.

11. A tire-building machine including a tire-forming core, a swingable support associated therewith, a carriage movable on the support in relation to the core and adapted to be tilted out of equilibrium whereby it is gravity actuated, and a stitcher device sustained by the carriage and moved along the fabric-covered surface of the core while the carriage is moving under the influence of gravity.

12. A tire-building machine including a tire-forming core, a stitcher-supporting instrumentality associated with the core, and a stitcher device on the instrumentality and movable toward the core and maintained in relation thereto by the force of gravity.

13. A tire-building machine including a tire-forming core, a support juxtaposed thereto, a stitcher sustaining carriage movable on the support in relation to the core, and a stitcher-device positionable by the carriage and maintained in pressing engagement with the core entirely by its own weight.

In witness whereof, I have hereunto signed my name in the presence of two subscribing witnesses.

ROLAND S. TROGNER.

Witnesses:
J. E. KEATING,
L. M. HARTMAN.